US009019506B1

(12) United States Patent
Black et al.

(10) Patent No.: US 9,019,506 B1
(45) Date of Patent: Apr. 28, 2015

(54) PHASE CONTROL FOR DUAL ATOM INTERFEROMETERS

(75) Inventors: Adam T. Black, Mountain View, CA (US); Todd L. Gustavson, Sunnyvale, CA (US); Brenton C. Young, Menlo Park, CA (US)

(73) Assignee: AOSense, Inc., Sunnyvale, CA (US)

( * ) Notice: Subject to any disclaimer, the term of this patent is extended or adjusted under 35 U.S.C. 154(b) by 512 days.

(21) Appl. No.: 13/363,090

(22) Filed: Jan. 31, 2012

(51) Int. Cl.
*G01B 9/02* (2006.01)

(52) U.S. Cl.
CPC ........................................ *G01B 9/02* (2013.01)

(58) Field of Classification Search
CPC ...... G01C 19/58; G01C 21/165; G21K 1/006; G01V 7/00
See application file for complete search history.

(56) References Cited

U.S. PATENT DOCUMENTS

| 7,847,924 B2 * | 12/2010 | Aarons et al. ................. 356/28.5 |
| 2005/0027489 A1 * | 2/2005 | Kasevich et al. ............. 702/189 |
| 2011/0073753 A1 * | 3/2011 | Bouyer et al. ................ 250/251 |

OTHER PUBLICATIONS

T. L. Gustavson, A. Landragin, M. A. Kasevich ("Rotation sensing with a dual atom interferometer Sagnac gyroscope", Class. Quantum Grav. 17 (2000) 2385-2398).*

* cited by examiner

*Primary Examiner* — Tri T Ton
*Assistant Examiner* — Willie Merrell, II
(74) *Attorney, Agent, or Firm* — Van Pelt, Yi & James LLP

(57) ABSTRACT

A system for controlling a phase measurement in an atom interferometer comprising one or more lasers, a processor, and a memory. The one or more lasers are for providing interrogating beams. A first group of atoms and a second group of atoms traverse an interrogating region of the atom interferometer in substantially opposite directions. The interrogating beams interact substantially simultaneously with both atoms in the first group and atoms in the second group. The first group of atoms and the second group of atoms interact with each of the interrogating beams in a different order. The processor is configured to determine a phase adjustment offset of at least one interrogating beam based at least in part on one or more past interactions of one or more interrogating beams with either the first group of atoms or the second group of atoms.

11 Claims, 4 Drawing Sheets

PHASE CONTROL FOR DUAL ATOM INTERFEROMETERS

BACKGROUND OF THE INVENTION

An atom interferometer exploits the wave-like properties of atoms to sensitively measure small energy differences between different spatial trajectories. It does this by measuring the interference effects that result when it manipulates a beam of atoms in such a way that the atomic wavepackets split into two or more components and subsequently recombine. A light-pulse atom interferometer uses optical pulses that interact with ensembles of atoms (e.g., a ball or cloud of atoms launched from a magneto-optic trap or from an atomic beam). The phases of the optical pulses can be manipulated to bias the output phase of the interferometer. For example, the manipulation is used to null the output phase of the interferometer and the manipulation signal then provides an interferometric measurement. In some cases, it is desirable to use a pair of interferometers that share optical pulses, and even more so, to use the pair of interferometers in a nulling configuration. However, as the same optical pulses are used for both of the interferometers, it is not simple to determine how to independently null each of the interferometers.

BRIEF DESCRIPTION OF THE DRAWINGS

Various embodiments of the invention are disclosed in the following detailed description and the accompanying drawings.

DETAILED DESCRIPTION

Figure 1:
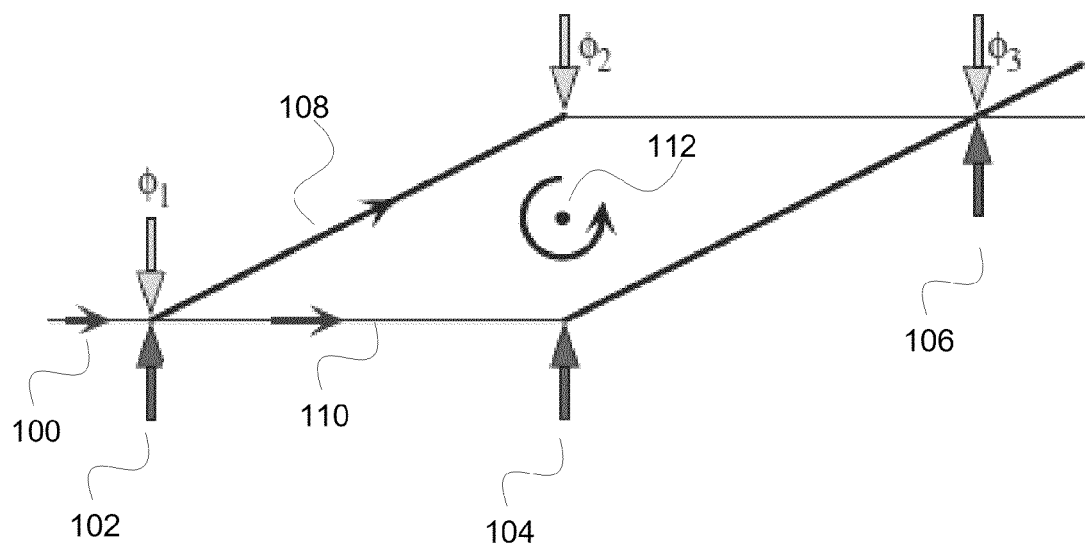
FIG. 1 is a diagram illustrating an embodiment of a light-pulse atom interferometer.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for controlling phase for atom interferometers is disclosed. The system for controlling a phase measurement in an atom interferometer comprises one or more lasers for providing a plurality of interrogating beams, a means to adjust the phase of one or more interrogating beams, a processor, and a memory. A first group of atoms and a second group of atoms traverse an interrogating region the atom interferometer in substantially opposite directions. One or more of the interrogating beams of the plurality of the interrogating beams interact substantially simultaneously with both atoms in the first group and atoms in the second group. The first group of atoms and the second group of atoms interact with two or more interrogating beams in a different order. The processor is configured to determine a phase adjustment offset of at least one interrogating beam of the plurality of interrogating beams based at least in part on one or more past interactions of one or more beams of the plurality of interrogating beams with either the first group of atoms or the second group of atoms. The memory is coupled to the processor and is configured to provide the processor with instructions.

In some embodiments, the processor stores information in the memory about the phase adjustments that were applied for particular pulses.

In some embodiments, inertial sensors based on light-pulse atom interferometry make use of one or more atom clouds or one or more atomic beams that interact with a sequence of optical interrogating pulses (e.g., Bragg pulses or Raman pulses). The optical pulses, which can be generated by laser beams with controllable phase or frequency, drive transitions between atomic momentum states (e.g., using Bragg pulses), and may also drive transitions between atomic internal states (e.g., using Raman pulses). In various embodiments, the optical pulses are generated by phase-locking, phase-modulation (e.g., electro-optic modulator or EOM), frequency shifting (e.g., by an acousto-optic modulator or AOM), or any other appropriate manner. The readout of the interferometer phase takes place via a measurement of atomic momentum-state or internal-state population following the sequence of interrogating pulses.

In some embodiments, an atom interferometer is configured as a rotation sensor. For example, a cesium atomic beam crosses three laser interaction regions where two-photon stimulated Raman transitions between cesium ground states transfer momentum to atoms and divide, deflect, and recombine the atomic wave packets. Although cesium is used in this example, other elements amenable to laser manipulation techniques may be used instead, such as rubidium. Rotation induces a phase shift between the two possible trajectories and causes a change in the detected number of atoms with a particular internal state. In some embodiments, counter-propagating atomic beams form two interferometers using shared lasers for common-mode rejection, and the rotation phase shifts have opposite signs since the phase shift is proportional to the vector velocity of the atoms. Therefore, subtracting or adding the interferometer signals discriminates between rotation and linear acceleration summed with laser arbitrary phase.

In some embodiments, a zero dead-time configuration is implemented in which multiple ensembles of atoms traverse an interrogating region of the atom interferometer in each of two substantially opposite directions. In some embodiments, at least two ensembles of atoms travelling in each of the two directions simultaneously interact with interrogation beams. The atomic ensembles exit the interferometer periodically, with period matching the time spacing between at least a subset of interrogation beams.

FIG. 1 is a diagram illustrating an embodiment of a light-pulse atom interferometer. In the example shown, the diagram in FIG. 1 represents the motion of the atoms relative to an inertial reference frame in which the horizontal axis is the position of the atoms in the direction defined by their initial center of mass velocity, and the vertical axis is position of the atoms in the direction defined by the Raman beams. For example, the diagram is a spatial representation of an interferometer in a plane perpendicular to Earth's gravity. For example, a group or ensemble of atoms is caused to move in a trajectory or along a path (e.g., beam 100). Atoms in beam 100 are pumped into a particular state (e.g., F=3 cesium ground state). Beam 100 passes through a sequence of three interferometer laser beams (e.g., laser beam 102, laser beam 104, laser beam 106). Laser beam 102 puts the atoms in a coherent superposition of two states (e.g., F=3 and F=4 ground states). Due to the conservation of momentum due to the laser interaction, each internal state is associated with a particular momentum along the interferometer laser axis. The interaction with laser beam 102 causes the atomic wave packets to divide into two trajectories (e.g., top trajectory 108 corresponding to state F=4 and bottom trajectory 110 corresponding to F=3). Laser beam 104 exchanges the atomic states and the momenta (e.g., using a π-pulse), deflecting the trajectories back towards each other. Laser beam 106 recombines the two trajectories so interference can occur. In some embodiments, a rotation (e.g., a rotation about axis 112) induces a phase-shift between the two paths of the interferometer, which is measurable in the interference after interaction with laser beam 106.

In various embodiments, laser beam 102, laser beam 104, and laser beam 106 are sourced from a single laser, are each sourced from a separate laser (e.g., three lasers), or any other appropriate combination of sources to produce laser beam 102, laser beam 104, and laser beam 106.

In some embodiments, the final atomic phase is a combination of the phases of the interrogating fields and the phase due to the motion of the atoms. The phases of the interrogating fields can be controlled (e.g., by a laser modulation signal on an EOM), and it is therefore possible to implement feedback to drive the overall interferometer phase to a desired value.

Figure 2:
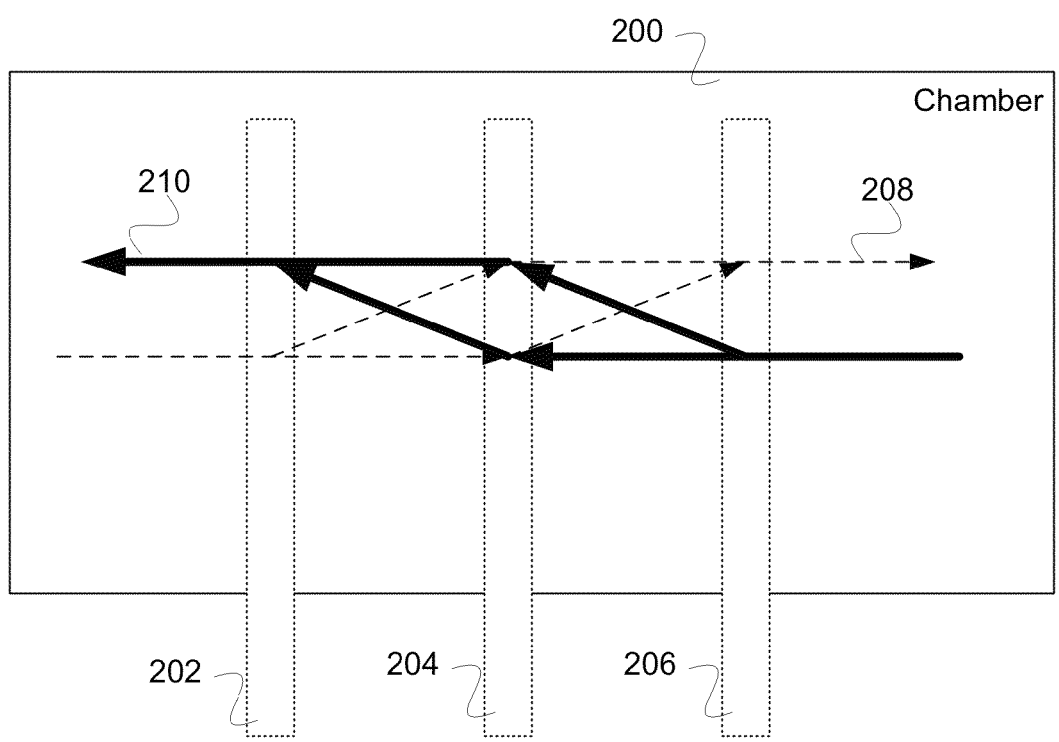
FIG. 2 is a diagram illustrating an embodiment of a pair of light-pulse atom interferometers.

FIG. 2 is a diagram illustrating an embodiment of a pair of light-pulse atom interferometers. In the example shown, in chamber 200 (e.g., a vacuum chamber), counter propagating atom beam 208 and atom beam 210 both interact with laser beam 202, laser beam 204, and laser beam 206. Atom beam 208 belongs to a left interferometer (e.g., "L") and atom beam 210 belongs to a right interferometer (e.g., "R"). The terms left and right are introduced for convenience and it should be evident that counter propagating velocities along any axis could be used. In many cases, it is desirable to drive a pair of interferometers with a single set of three or more interrogating laser beams, such that the first interrogating pulse for one interferometer (the "left" interferometer) is driven by the same beam as the last interrogating pulse for the other interferometer (the "right" interferometer). Further, it is desirable to independently control the phase of the two interferometers.

In some cases, such as when the two interferometers have different velocity projections along the interrogating beam where atoms intersect with a particular laser beam, it is possible to independently control the two interferometer phases by addressing the atoms with copropagating optical fields such that one field addresses the atoms of the left interferometer and the other field addresses the atoms of the right interferometer. In this case, the selectivity can be provided by different Doppler shifts of the atom clouds, so that optical fields at different frequencies address different interferometers.

In some interferometer geometries, cloud selection by means of differential Doppler shift is not possible. This occurs when the magnitude of the projection of the atomic velocity along the interrogating beams propagation direction is substantially identical for the two interferometers at each of the interrogating beam locations. (For example, when the atom trajectories are overlapped with one another and the atoms propagate in opposite directions orthogonal to the interrogating beams at identical speeds, this condition is fulfilled.) In some embodiments, the opposite directions and orthogonality of the atoms and interrogating beams is neither exact nor is the speed of the atoms exactly identical, however, these conditions are close enough that addressing the atom beams of the two interferometers cannot be easily or practically addressed separately so that the atom beams are addressed simultaneously. In this case, the method described herein can be used to independently control the phase of the two interferometers.

The overall phases of the two interferometers are given by $$\Phi_L^i = \phi_L^i + \phi_A^{i-2} - 2\phi_B^{i-1} + \phi_C^i \quad \text{(Equation 1)}$$

$$\Phi_R^i = \phi_R^i + \phi_C^{i-2} - 2\phi_B^{i-1} + \phi_A^i \quad \text{(Equation 2)}$$

where $\Phi_L^i$ and $\Phi_R^i$ are the overall interferometer phases for the left and right interferometers, respectively, at the ith iteration of the interferometer (e.g., the ith atom cloud exiting the interferometer), $\phi_L^i$ and $\phi_R^i$ are arbitrary phases composed of inertial and systematic contributions (due, for example, to magnetic field-induced frequency shifts) at the ith iteration of the interferometer, and $\phi_A^i$, $\phi_B^i$, and $\phi_C^i$ are the phases of the three interrogating optical fields (e.g., corresponding to the phases associated with the interactions with laser beam 202 ('A'), laser beam 204 ('B'), and laser beam 206 ('C')) that are pulsed simultaneously before the ith interferometer output. (In the case of interferometers comprising more than three interrogating pulses, the phases of any additional pulses may be subsumed into the $\phi_B^i$ terms.) It is apparent that the phase of a single interrogating pulse contributes to both the left and right overall interferometer phases: for example, the phase of $\phi_A^i$ contributes to both $\Phi_R^i$ and $\Phi_L^{i+2}$.

The method for simultaneous control of the two interferometer phases is then to choose the phase of each interferometer's final interrogating pulse (C for the left interferometer and A for the right interferometer) so that the desired overall phase is obtained. This chosen interrogating pulse phase must take into account the phases of previous interrogating pulses, including those phases previously chosen to control the phase of an earlier iteration of the interferometers. For example, the phases that must be chosen in order to zero the phases of the two interferometers simultaneously are:

$$\phi_C^i = -\widetilde{\phi}_L^i - \phi_A^{i-2} + 2\phi_B^{i-1} \quad \text{(Equation 3)}$$

$$\phi_A^i = -\widetilde{\phi}_R^i - \phi_C^{i-2} + 2\phi_B^{i-1} \quad \text{(Equation 4)}$$

where the applied phases must include an estimate $\widetilde{\phi}_L^i$ and $\widetilde{\phi}_R^i$ of the values of $\phi_L^i$ and $\phi_R^i$, respectively. In some embodiments, a first applied phase is determined using a first interaction at a first past time of a first group of atoms with a first laser beam and a second interaction at a second past time of the first group of atoms with a second laser beam (e.g., the (i-1) iteration and (i-2) iteration terms in either of the phase equations for the ith iteration). In some embodiments, a second applied phase is determined using a first interaction at a first past time of a second group of atoms with a first laser beam and a second interaction at a second past time of the second group of atoms with a second laser beam (e.g., the (i-1) iteration and (i-2) iteration terms in either of the phase equations for the ith iteration).

The solutions to the above equations can be given in closed form as:

$$\phi_C^i = -\sum_{j=0}^{\lfloor (i-1)/4 \rfloor} \widetilde{\phi}_L^{i-4j} + \sum_{j=0}^{\lfloor (i-3)/4 \rfloor} \widetilde{\phi}_R^{i-2-4j} + 2\sum_{j=0}^{\lfloor (i-1)/2 \rfloor - 1} (-1)^j \phi_B^{i-1-2j}$$

$$\phi_A^i = -\sum_{j=0}^{\lfloor (i-1)/4 \rfloor} \widetilde{\phi}_R^{i-4j} + \sum_{j=0}^{\lfloor (i-3)/4 \rfloor} \widetilde{\phi}_L^{i-2-4j} + 2\sum_{j=0}^{\lfloor (i-1)/2 \rfloor - 1} (-1)^j \phi_B^{i-1-2j}$$

where the index i starts at 1 and we have arbitrarily chosen the initial phase values $\phi_A^1 = \phi_A^2 = \phi_C^1 = \phi_C^2 = 0$. The brackets used in the upper limits of the sums denote the integer floor function: for example, $\lfloor i/4 \rfloor$ denotes the largest integer less than or equal to i/4. Any value of the π-pulse phase $\phi_B^i$ can be chosen for all values of i, so long as the phases $\phi_C^i$ and $\phi_A^i$ are chosen according to the solutions above. Control of the interferometer phases does not require explicit computation and storage in memory of all terms of this closed-form solution; equation 1 and equation 2 are sufficient to determine the applied phases required to zero the interferometer phases.

Figure 3:
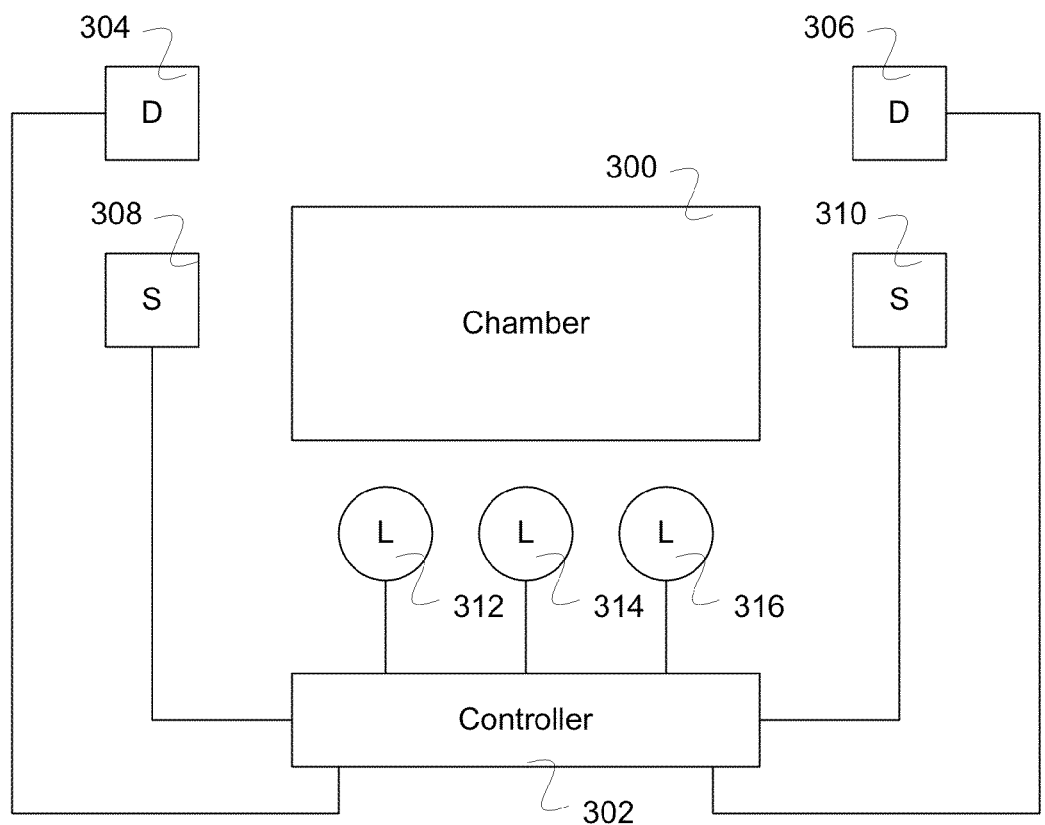
FIG. 3 is a block diagram illustrating an embodiment of a pair of light-pulse atom interferometers.

FIG. 3 is a block diagram illustrating an embodiment of a pair of light-pulse atom interferometers. In the example shown, atom source 308 and atom source 310 provide atom beams for a pair of atom interferometers. In some embodiments, atom source 308 and atom source 310 are inside chamber 300. Atom beams propagate into chamber 300, where they interact with laser beams provided by laser 312, laser 314, and laser 316. The phases of the interferometers are measured using detector 304 and detector 306. Controller 302 provides control signals for atom source 308, atom source 310, laser 312, laser 314, and laser 316, and receives measurement signals from detector 304 and detector 306. In various embodiments, controller 302 comprises one or more processors, one or more components, or any other appropriate configuration for a controller. In some embodiments, controller 302 adjusts the vapor pressure of the atomic source. In various embodiments, controller 302 provides or adjusts laser control currents, laser amplitude, frequency and phase control signals, magnetic field control, atomic vapor control, atom detection control, system timing, or any other appropriate control signals. In various embodiments, controller 302 provides instructions, control signals, or adjustments for other laser beams used to cool, trap, and or launch atoms with appropriate velocities, or any other appropriate control signals. In some embodiments, for time-domain interferometers, controller 302 pulses the interferometer interrogating beams at uniformly spaced times. In some embodiments, the controller utilizes auxiliary accelerometer or gyroscope sensors to calculate the approximate inertial phase correction for use in zeroing the interferometer phase output. In some embodiments, the processor of the controller is configured to determine a phase adjustment offset of at least one interrogating beam of the plurality of interrogating beams based at least in part on inputs from one or more auxiliary inertial sensors. In various embodiments, controller 302 comprises a processor, which is an embedded microprocessor or microcontroller, a programmable logic device such as a field programmable gate array (FPGA), a standard processor, or any other appropriate processor or processors.

In some embodiments, to initialize the system, controller 302 initiates loading of atoms into atom source 308 and atom source 310, and initiates launches of atoms from the atom sources into chamber 300. Controller 302 provides timing, frequency and phase control of laser 312, laser 314 and laser 316. To implement the phase adjustment, controller 302 determines atomic populations based on signals from detector 304 and detector 306, and calculates interferometer phase from the populations. Controller 302 then updates the phases of laser 312 and laser 316 based on the measured phase and previously applied phases in order to reach a desired total interferometer phase. In some embodiments, controller 302 implements a servo algorithm to stabilize the phase at a desired value. The phase applied by controller 302 is stored in system memory and constitutes a component of the interferometer's output signal.

Figure 4:
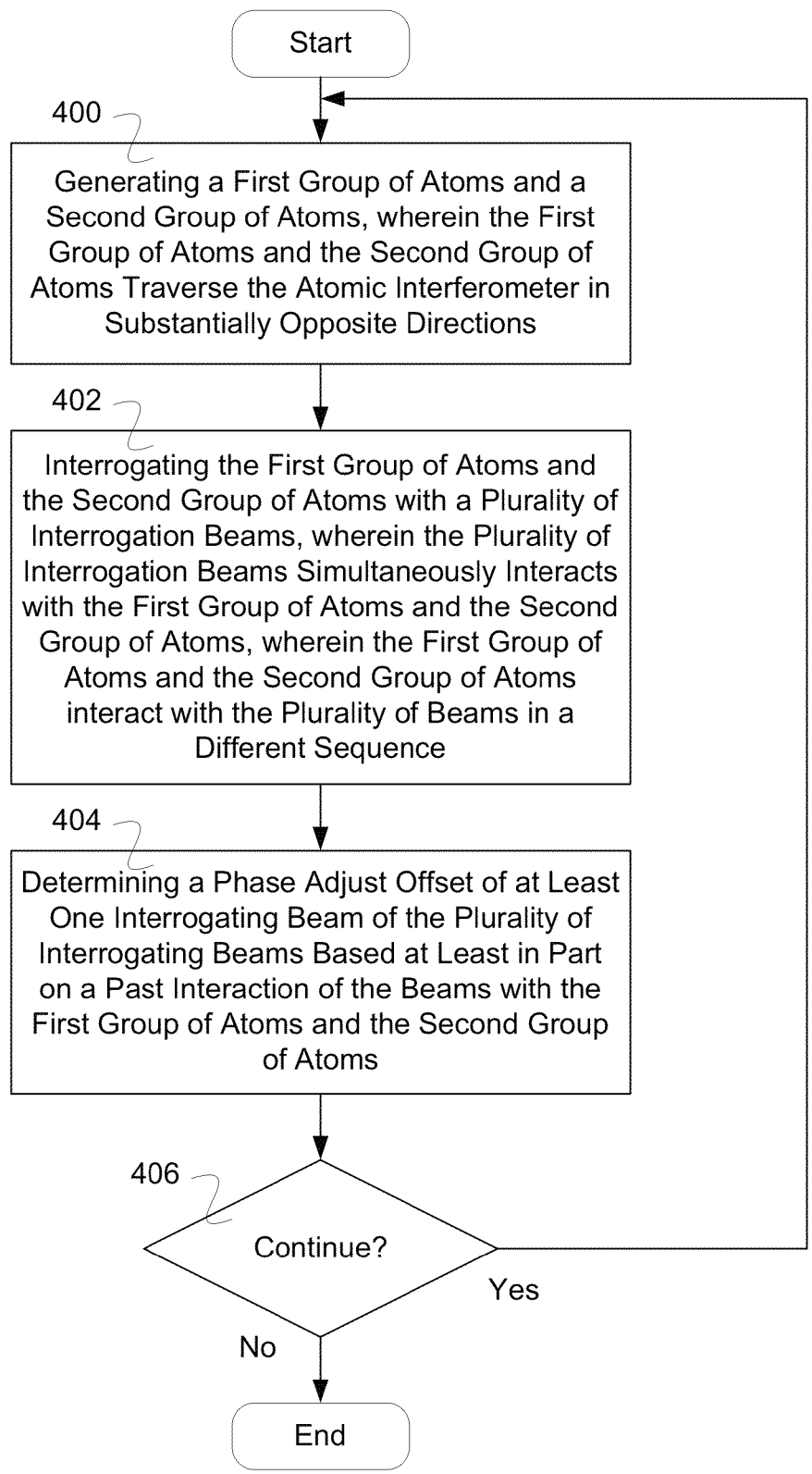
FIG. 4 is a flow diagram illustrating an embodiment of a process for controlling a phase measurement in a light-pulse atom interferometer.

FIG. 4 is a flow diagram illustrating an embodiment of a process for controlling a phase measurement in a light-pulse atom interferometer. In the example shown, in 400 a first group of atoms and a second group of atoms are generated, wherein the first group of atoms and the second group of atoms traverse the interferometer interrogating region in substantially opposite directions. For example, the two groups of atoms are contained within the vacuum chamber housing the atom interferometers. The two groups of atoms are launched substantially towards each other, with equal or nearly equal magnitude of launch velocity components in the direction parallel to the propagation direction of the interrogating beams and opposite or nearly opposite velocity components along the vector separating the launch points of the two groups of atoms, so that they each traverse three interrogating laser beams. The beams are aligned to maximize signal. In various embodiments, the trajectories of the atoms are askew or offset from each other, but still allowing the shared laser beams to interact with both the two groups of atoms simultaneously or substantially at the same time. The different velocity classes could be contained within a shared vacuum chamber or within separate vacuum chambers with windows allowing access for shared interrogating laser beams. In various embodiments, ensembles of atoms are directed with appropriate velocities in various ways, including thermal atomic beams with or without subsequent laser cooling, 2D-Magneto-optic traps (2D-MOTs) with or without pushing laser beams aligned nearly along the output direction, or 3D-MOTs or atoms trapped in optical molasses or optical lattices launched by appropriate laser frequency shifts, or in any other appropriate manner. It should be noted that there are many ways to manipulate atom velocities that are well known in the art of atomic physics and the above list is not meant to be exhaustive. In some embodiments, one beam of the plurality of interrogating beams interacts with the first group of atoms in a different order than with the second group of atoms. For example, a left interrogating beam interacts with a group (i-2) of atoms entering from a left atom beam and a group 'i' of atoms entering from a right atom beam. Or, for example, a center interrogating beam interacts with a group (i-1) of atoms entering from a left atom beam and a group (i-1) of atoms entering from a right atom beam (e.g., atoms entering at the same time from the left and right sides of the interferometer). Or, for example, a right interrogating beam interacts with a group (i-2) of atoms entering from a right atom beam and a group 'i' of atoms entering from a left atom beam.

In 402, the first group of atoms and the second group of atoms are interrogated with a plurality of interrogating beams, wherein one or more of the plurality of interrogating beams interacts with both the first group of atoms and the second group of atoms. In 404, a phase adjustment offset of at least one interrogating beam of the plurality of interrogating beams is determined based at least in part on a past interaction of the beams with the first group of atoms and the second group of atoms. In some embodiments, the phase adjustment offset is determined for the two groups of atoms targeting a zero-crossing of phase (e.g., a phase measurement corresponding to a zero-crossing) for each of the groups as measured using the detectors of the light-pulse atom interferometer. In some embodiments, external rotation or acceleration sensors are included and outputs are integrated to better predict the phase adjustment offset needed to zero the output phase.

In 406, it is determined whether to continue. In the event that it is determined to continue, control passes to 400. In the event that it is determine not to continue, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for controlling a phase measurement in an atom interferometer, comprising:
   one or more lasers for providing a plurality of interrogating beams, wherein a first group of atoms and a second group of atoms traverse an interrogating region of the atom interferometer in substantially opposite directions, wherein one or more of the interrogating beams of the plurality of the interrogating beams interact substantially simultaneously with both atoms in the first group and atoms in the second group, and wherein the first group of atoms and the second group of atoms interact with one or more beams in a different order; and
   a processor configured to:
      determine a phase adjustment offset of at least one interrogating beam of the plurality of interrogating beams based at least in part on one or more past interactions of one or more beams of the plurality of interrogating beams with either the first group of atoms or the second group of atoms wherein the phase adjustment offset, $\phi_C^i$, at an ith iteration of a third interrogating beam of the plurality of interrogating beams is calculated using $\phi_C^i = -\widetilde{\phi}_L^i - \phi_A^{i-2} + 2\phi_B^{i-1}$, wherein $\phi_A^{i-2}$, comprises a phase of a first interrogating beam of the plurality of interrogating beams at the (i-2) iteration, $\phi_B^{i-1}$ comprises a phase of a second interrogating beam of the plurality of interrogating beams at the (i-1) iteration, and $\widetilde{\phi}_L^i$ is an estimate of the value of $\phi_L^i$, wherein $\phi_L^i$ comprises the phase at the ith iteration of a left atom interferometer; and
   a memory coupled to the processor and configured to provide the processor with instructions.

2. A system as in claim 1, wherein the plurality of interrogating beams comprise three interrogating beams.

3. A system as in claim 1, wherein the plurality of interrogating beams are sourced from a single laser.

4. A system as in claim 1, wherein each of the plurality of interrogating beams is sourced from a separate laser.

5. A system as in claim 1, wherein the processor is configured to determine a phase adjustment offset of at least one interrogating beam of the plurality of interrogating beams based at least in part on inputs from one or more auxiliary inertial sensors.

6. A system as in claim 5, wherein a sensor of the one or more auxiliary inertial sensor comprises an accelerometer.

7. A system as in claim 5, wherein a sensor of the one or more auxiliary inertial sensor comprises a gyroscope.

8. A system as in claim 1, wherein the phase adjustment offset for the at least one interrogating beam of the plurality of interrogating beams is determined in order to target one or more zero-crossings of phase as measured by one or more atom interferometers.

9. A system as in claim 1, wherein the phase adjustment offset, $\phi_A^i$, at an ith iteration of a third interrogating beam of the plurality of interrogating beams is calculated using $\phi_A^i = -\widetilde{\phi}_R^i - \phi_C^{i-2} + 2\phi_B^{i-1}$, wherein $\phi_C^{i-2}$, comprises a phase of a first interrogating beam of the plurality of interrogating beams at the (i-2) iteration, $\phi_B^{i-1}$ comprises a phase of a second interrogating beam of the plurality of interrogating beams at the (i-1) iteration, and $\widetilde{\phi}_R^i$ is an estimate of the value of $\phi_R^i$, wherein $\phi_R^i$ comprises the phase at the ith iteration of the right atom interferometer.

10. A method for controlling a phase measurement in an atom interferometer, comprising:
   providing a plurality of interrogating beams using one or more lasers, wherein a first group of atoms and a second group of atoms traverse an interrogating region of the atom interferometer in substantially opposite directions, wherein one or more of the interrogating beams of the plurality of the interrogating beams interact substantially simultaneously with both atoms in the first group and atoms in the second group, and wherein the first group of atoms and the second group of atoms interact with one or more beams in a different order; and
   determining, using a processor, a phase adjustment offset of at least one interrogating beam of the plurality of interrogating beams based at least in part on one or more past interactions of one or more beams of the plurality of interrogating beams with either the first group of atoms or the second group of atoms wherein the phase adjustment offset, $\phi_C^i$, at an ith iteration of a third interrogating beam of the plurality of interrogating beams is calculated using $\phi_C^i = -\widetilde{\phi}_L^i - \phi_A^{i-2} + 2\phi_B^{i-1}$, wherein $\phi_A^{i-2}$, comprises a phase of a first interrogating beam of the plurality of interrogating beams at the (i-2) iteration, $\phi_B^{i-1}$ comprises a phase of a second interrogating beam of the plurality of interrogating beams at the (i-1) iteration, and $\widetilde{\phi}_L^i$ is an estimate of the value of $\phi_L^i$, wherein $\phi_L^i$ comprises the phase at the ith iteration of a left atom interferometer.

11. A computer program product for controlling a phase measurement in an atom interferometer, the computer program product being embodied in a non-transitory computer readable storage medium and comprising computer instructions for:

a computer readable program code means for-providing a plurality of interrogating beams using one or more lasers, wherein a first group of atoms and a second group of atoms traverse an interrogating region of the atom interferometer in substantially opposite directions, wherein one or more of the interrogating beams of the plurality of the interrogating beams interact substantially simultaneously with both atoms in the first group and atoms in the second group, and wherein the first group of atoms and the second group of atoms interact with one or more beams in a different order; and a computer readable program code means for determining a phase adjustment offset of at least one interrogating beam of the plurality of interrogating beams based at least in part on one or more past interactions of one or more beams of the plurality of interrogating beams with either the first group of atoms or the second group of atoms wherein the phase adjustment offset, $\phi_C^i$, at an ith iteration of a third interrogating beam of the plurality of interrogating is calculated using $\phi_C^i = -\widetilde{\phi}_L^i - \phi_A^{i-2} + 2\phi_B^{i-1}$, wherein $\phi_A^{i-2}$, comprises a phase of a first interrogating beam of the plurality of interrogating beams at the i-2) iteration, $\phi_B^{i-1}$ comprises a phase of a second interrogating beam of the plurality of interrogation beams at the (i-1) iteration, and $\widetilde{\phi}_L^i$ is an estimate of the value of $\phi_L^i$, wherein $\phi_L^i$ comprises the phase at the ith iteration of a left atom interferometer.

* * * * *

UNITED STATES PATENT AND TRADEMARK OFFICE
CERTIFICATE OF CORRECTION

PATENT NO. : 9,019,506 B1
APPLICATION NO. : 13/363090
DATED : April 28, 2015
INVENTOR(S) : Black et al.

Page 1 of 1

It is certified that error appears in the above-identified patent and that said Letters Patent is hereby corrected as shown below:

In The Claims

In Column 9, Claim 11, Line 22, delete "i-2)" and insert --(i-2)--, therefor.

Signed and Sealed this
Sixteenth Day of August, 2016

Michelle K. Lee
*Director of the United States Patent and Trademark Office*